United States Patent
Stergiou et al.

(10) Patent No.: US 8,290,934 B2
(45) Date of Patent: Oct. 16, 2012

(54) METHOD AND SYSTEM FOR PROCESSING ACCESS CONTROL LISTS USING A HASHING SCHEME

(75) Inventors: Stergios Stergiou, Palo Alto, CA (US); Jawahar Jain, Los Altos, CA (US)

(73) Assignee: fujitsu Limited, Kawasaki-shi (JP)

( * ) Notice: Subject to any disclaimer, the term of this patent is extended or adjusted under 35 U.S.C. 154(b) by 372 days.

(21) Appl. No.: 12/537,250

(22) Filed: Aug. 6, 2009

(65) Prior Publication Data

US 2010/0036820 A1 Feb. 11, 2010

Related U.S. Application Data

(60) Provisional application No. 61/086,680, filed on Aug. 6, 2008.

(51) Int. Cl.
*G06F 7/00* (2006.01)
(52) U.S. Cl. ........................................ 707/716
(58) Field of Classification Search ............ 707/E17.014
See application file for complete search history.

(56) References Cited

U.S. PATENT DOCUMENTS

| | | | |
|---|---|---|---|
| 7,539,750 B1 * | 5/2009 | Parker et al. | 709/224 |
| 2006/0002386 A1 * | 1/2006 | Yik et al. | 370/389 |
| 2008/0049774 A1 * | 2/2008 | Swenson et al. | 370/412 |

OTHER PUBLICATIONS

Rasmus Pagh "Cuckoo Hashing" IT University of Copenhagen, Rued Langgaardsvej 7, 2300 København S, Denmark Flemming Friche Rodler 2 On-Air A/S, Digtervejen 9, 9200 Aalborg SV, Denmark.*

* cited by examiner

*Primary Examiner* — Rehana Perveen
*Assistant Examiner* — Masoud S Hakami
(74) *Attorney, Agent, or Firm* — Baker Botts L.L.P.

(57) ABSTRACT

A method for processing access control lists using a hashing scheme includes receiving a packet identifying data and determining a fixed number of a plurality of hash tables comprising a fixed number of two or more buckets comprising a fixed number of one or more entries, such that the two or more hash tables store data in memory associated with an access control list. The method also includes searching the one or more hash tables in parallel for the identifying data using a plurality of hashing functions and returning a search result.

20 Claims, 2 Drawing Sheets

METHOD AND SYSTEM FOR PROCESSING ACCESS CONTROL LISTS USING A HASHING SCHEME

RELATED APPLICATION

This application claims priority under 35 U.S.C. §119(e) to U.S. Provisional Application Ser. No. 61/086,680 filed Aug. 6, 2008, which is hereby incorporated by reference in its entirety.

TECHNICAL FIELD

The present disclosure relates generally to access control lists, and more particularly to processing access control lists using a hashing scheme.

BACKGROUND

One of the largest problems facing the Internet infrastructure comes from the enormous growth of the Internet routing tables. For example, a router may have more than 200,000 routes stored in its routing table. In order to implement packet forwarding and filtering, a router is required to perform lookup operations on its access control list based on the source and destination IP address from incoming IP packets. Thus, the ability to efficiently implement packet forwarding and filtering presents a significant challenge to system designers and network operators.

SUMMARY

In accordance with the teachings of the present disclosure, a system and method for processing access control lists using a hashing scheme are provided. In a particular embodiment, a method for processing access control lists using a hashing scheme comprises receiving a packet comprising identifying data, and determining a fixed number of a plurality of hash tables comprising a fixed number of two or more buckets comprising a fixed number of one or more entries, such that the two or more hash tables store data in memory associated with an access control list. The method further includes searching the one or more hash tables in parallel for the identifying data using a plurality of hashing functions and returning a search result.

In a particular embodiment, a method for processing access control lists using a hashing scheme comprises means for receiving a packet comprising identifying data, and means for determining a fixed number of one or more hash tables comprising a fixed number of one or more buckets comprising a fixed number of one or more entries, such that the one or more hash tables store data in memory associated with an access control list. The system further includes means for searching the one or more hash tables in parallel for the identifying data using a plurality of hashing functions and returning a search result, wherein the searching is performed in constant time and the search result is guaranteed not to exceed a fixed time.

Certain embodiments of the invention may provide one or more technical advantages. For example, hash-based schemes that operate in constant time with access control lists may provide one or more advantages over previous ternary content-addressable memory (TCAM) based approaches. A random access memory (RAM) may require less than half the area required by a similarly sized TCAM. Moreover, a TCAM may consume more power. Furthermore, RAMs have been the target of several optimizations and are usually faster than TCAMs.

Other technical advantages of the disclosed system may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and features and advantages thereof, reference is now made to the following description, taken in conjunction with the accompanying drawings, in which.

DETAILED DESCRIPTION

Figure 1:
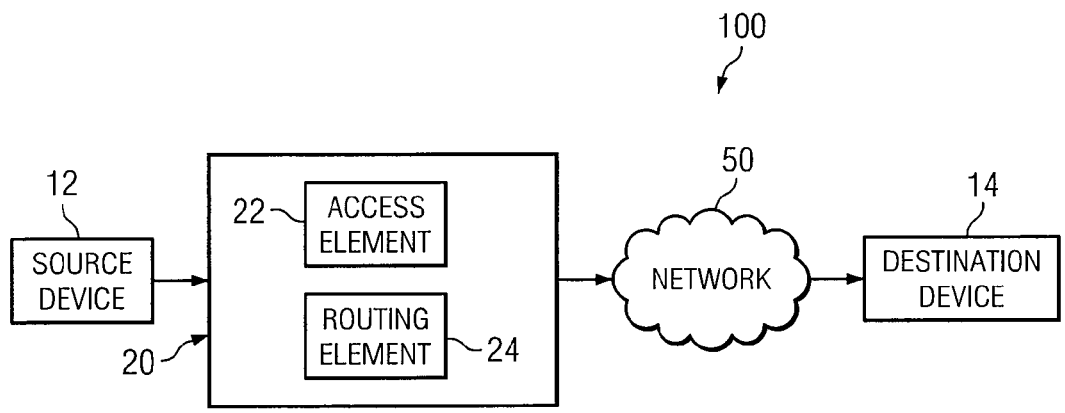
FIG. 1 is a block diagram illustrating a system for determining if data from a source device has permission to be routed to a destination device in accordance with a particular embodiment of the present disclosure.

FIG. 1 is a block diagram illustrating a system 100 for determining if data from a source device 12 has permission to be routed to a destination device 14 in accordance with a particular embodiment. System 100 may include a network 20 coupled to a source device 12, a destination device 14, and a processing device 20. As illustrated, processing device 20 may also include an access element 22 for determining if data from source device 12 has permission to be routed to destination device 14 and a routing element 24 for routing the data from source device 12 to destination device 14, if the data has permission to be routed to destination device 14.

Source device 12 may be operable to send data to destination device 14. Source device 12 and destination device 14 may generally be any processor-controlled device or combination of two or more such devices capable of executing a computing operation. For example, source device and/or destination device may include a computer, a personal digital assistant (PDA), a laptop or an electronic notebook, a telephone, a mobile station, or any other device, component, element, or object capable of initiating data exchanges within system 100. In one embodiment, the data sent by source device 12 may be sent in one or more Internet Protocol (IP) packets. An IP packet may include the IP address of source device 12 and the IP address of destination device 14.

Processing device 20 may be operable to receive data from source device 12, determine if the data has permission to be routed to destination device 14, and route the data to destination device 14. For example, processing device 20 may be a router or a server. Processing device 20 may generally be any processor-controlled device or combination of two or more such devices capable of executing a computing operation. Processing device 20 may execute applications, logic, and/or algorithms. Such applications may include software or other logic embodied in a computer-readable medium.

Each processing device 20 may include one or more suitable input devices, output devices, mass storage media, processors, memory, interfaces, communication ports, or other appropriate components and/or software for receiving, processing, storing, and communicating information according to the operation of system 10.

Processing device 20 may include access element 22 to determine if data from source device 12 has permission to be routed to destination device 14. An access control list may include a list of rules that determine whether or not the data has permission to be forwarded from source device 12 to destination device 14. If the data is not permitted to be forwarded, it may be dropped. For a small-scale processing device 20 where requirements on bandwidth are not critical, access element 22 may be implemented using software.

Processing device 20 may include routing element 24 to route the data from source device 12 to destination device 14 if access element 22 determines that the data is permitted to be routed to device 14. Routing element 24 may use the Border Gateway Protocol (BGP), which is a protocol for routing data over the Internet. The BGP may include a table of IP networks or other identifying information which designate network reachability using an autonomous system. An autonomous system may be a collection of IP networks and routers under the control of one or more entities that present a common routing policy to the Internet.

Processing device 20, access element 22, and routing element 24 may include any suitable elements, hardware, software, objects, or components capable of effectuating their operations or additional operations where appropriate. Additionally, any one or more of the elements included in processing device 20 may be provided in an external structure or combined into a single module or device where appropriate.

Communication network 50 represents communication equipment, including hardware and any appropriate controlling logic for interconnecting elements coupled to communication network 50. In general, communication network 50 may be any network capable of transmitting audio and/or video telecommunication signals, data, and/or messages, including signals, data, or messages transmitted through text chat, instant messaging, and e-mail. Accordingly, communication network 50 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. Additionally, communication network 50 may represent any hardware and/or software configured to communicate information in the form of packets, cells, frames, segments or other portions of data. To facilitate the described communication capabilities, communication network 50 may include routers, hubs, switches, gateways, call controllers, and or any other suitable components in any suitable form or arrangements. Although communication network 50 is illustrated as a single network, communication network 50 may include any number or configuration of networks. Moreover, system 100 may include any number or configuration of communication networks 50.

It should be understood that modifications, additions, or omissions may be made to system 100. Additionally, while the embodiment of system 100 illustrated in FIG. 1 includes particular components that are each configured to provide certain functionality, alternative embodiments may include any appropriate combination of components with the described functionality divided between the components in any suitable manner.

Figure 2:
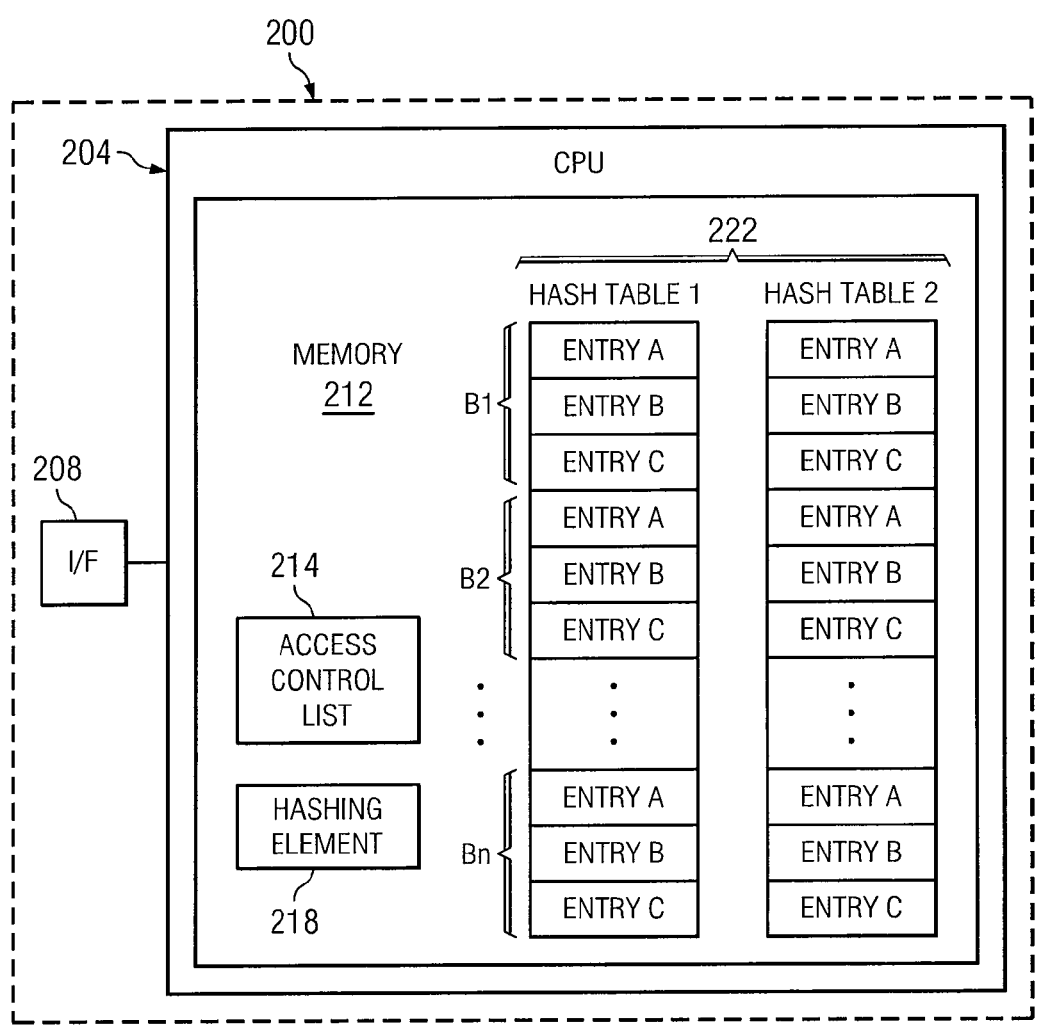
FIG. 2 is a block diagram illustrating a processing device with a hashing element for determining if data has permission to be routed in accordance with a particular embodiment of the present disclosure.

FIG. 2 is a block diagram illustrating a processing device 200 with a hashing element for determining, if data has permission to be routed in accordance with a particular embodiment of the present disclosure. Processing device 200 may include a processor 204, an interface 208, a memory 212, an access control list 214, a hashing element 218, and one or more hashing tables 222, each table comprising one or more buckets, each bucket comprising one or more entries.

Processor 204 may be coupled to interface 208 and control the operation of processing device 200 and/or minimization element, and/or TCAM. In particular, processor 204 may execute commands and instructions. In particular embodiments, processor 204 may include application-specific integrated circuits (ASICs), field-programmable gate arrays (FGPAs), digital signal processors (DSPs), and/or any other suitable specific or general purpose processors.

Interface 208 may be any port or connection, real or virtual, including any suitable hardware and/or software that may allow processing device 200 to exchange information and signals. In particular embodiments, interface 208 may include a network interface card (NIC), Ethernet driver, universal serial bus (USB) drive, network card and/or firewall. Generally, interface 208 may receive and forward data.

Access control list 212 may be any data structure that includes rules that determine whether the data received from a source device should be forwarded to a destination device. For example, access control list 212 may include the source and destination IP address tuples that indicate the packets that are not allowed to be forwarded through the processing device 200 (e.g., a router). In one embodiment, access control list 212 may be represented by $L=\{<IP_s,IP_d>_i\}$. Typically, Internet Protocol (IP) addresses are thirty-two bit-long integers and, therefore, each tuple may be characterized by a sixty-four bit number. In one embodiment, IP addresses may be 128 bit-long integers for IPv6 and, therefore, each tuple may be characterized by a 256 bit number.

In one embodiment, hashing element 218 may decide whether to permit forwarding a corresponding packet by determining if the source and/or destination IP address in a tuple T are listed on access control list. In one embodiment, this determination is made by evaluating a function $f$ with variable assignments obtained from tuple T. For example, if tuple T is 10011 . . . 10 in binary, hashing element 218 may calculate $f(1, 0, 0, 1, 1, \ldots, 1, 0)$.

In one embodiment, identifying data of a packet may be associated with any information that identifies attributes of the packet for filtering in an access control list. For example, identifying data of a packet may comprise a tuple T value of sixty-four bits comprising a thirty-two bit value associated with a source Internet Protocol address and a thirty-two bit value associated with a destination Internet Protocol address.

In one embodiment, hashing element 218 may construct a minterm $m_i$ for each tuple i that comprises sixty-four variables. In one embodiment, the tuple may be represented as 1101111010101111001000000000011100100000000000011 01101111010101111.
by the minterm $x_1 x_2 \bar{x}_3 x_4 x_5 \ldots \bar{x}_{60} x_{61} x_{62} x_{63} x_{64}$.
In one embodiment, hashing element 218 may construct a function $f$, where $$f(x_1, \ldots, x_{64}) = \bigvee_{i=1}^{|L|} m_i.$$

In one embodiment, hashing element 218 may put each minterm into a hash table 222. A hash function may be used to detect a bucket B in the one or more hash tables 222 that may contain the tuple comprising a source and destination IP address of the received packet. In particular embodiments, all entries in B may be examined. In one embodiment, if the tuple is found, the corresponding packet may be held back or discarded, i.e., not forwarded.

For purposes of explanation only and not limitation, hashing schemes typically fall into one of two categories: "open addressing" and "chaining." In one or both cases, it may be necessary to examine more than one position in the one or more hash tables 222 to determine if the tuple T is contained in the one or more hash tables 222. Additionally, if the position being examined does not include the tuple T, then the next position to examine may depend on the current position. Thus, the number of positions to examine may not be fixed without a guaranteed lookup time. Such hashing schemes may provide unpredictable performance, and predictability may be necessary for the applications utilizing them, especially for routers 200 accessing values in access control lists 214. Some data structures (e.g., a binary search balance tree) may guarantee a worst case lookup time, but these data structures may run very slow at a speed of O(log n).

In particular embodiments, access control lists 212 may require a guarantee of a worst case lookup time to ensure timely delivery of packets. For example, access control lists 212 may require a determination on whether or not to route a packet within ten clock cycles. Typically only hardware implementations (e.g., TCAMs) can provide a guarantee of a worst case lookup time in searches associated with access control lists 212. However, hardware implementations maybe more expensive than software implementations.

In particular embodiments, hashing element 218 may use one or more hashing schemes that include a plurality of hash functions, a fixed number of hash tables, a fixed number of buckets, and/or a fixed number of entries per bucket (e.g., cuckoo hashing or its variations) associated with searching for matches in access control lists 212, such that the hashing schemes may guarantee a worst case lookup in constant time 0(1).

In one embodiment, cuckoo hashing may use two hash tables 222, T1 and T2, each consisting of b buckets, and two hash functions h1, h2: $U \rightarrow \{0, \ldots, b-1\}$. In this embodiment, every key (e.g., the sixty-four bit value comprising the source and destination IP address of the received packet) may be stored either in cell $h1(x)$ of T1 or in cell $h2(x)$ of T2, but never in both. Furthermore, the two hash functions may search two locations in parallel, which provides for two possible locations for the key. When a new key is inserted, an algorithm may be used, which includes a new key being inserted in one of its two possible locations. If both locations are full, displacing a random key, one of the keys in those locations is displaced. This displaced key is then inserted in its alternative location. This may possibly displace another key residing in that alternative location. This process of displacing keys continues until a vacant position is found or the table is full.

Hashing element 218 may use cuckoo hashing to guarantee a fixed lookup time for determining if the tuple T is located in the one or more hashing tables 222. In one embodiment, more than two hashing functions may be utilized. In one embodiment, the number h of utilized hash functions and the number of entries per bucket b may parameterize such a hashing scheme, which may be referred to as (h,b)-hashing. Schemes with b>1, h>1 often provide sufficiently high utilization factors, e.g., >85%.

In one embodiment, hashing element 218 may apply all h hashing functions to a given tuple in parallel and the corresponding buckets are pulled from memory 212 in parallel. For example, hashing element 218 may evaluate all b·h entries in parallel and discard a packet if a match is found for its corresponding tuple. For example, hashing element 218 may perform six searches in parallel if two hashing functions are being utilized, and buckets contain three entries each.

In one embodiment, hashing element 218 may increase efficiency by utilizing a memory structure capable of providing h results in a single clock cycle. To read out an entire bucket in a single clock cycle, the memory may be 64·b bits wide. In some embodiments, access ports may be fewer than h or the width may be smaller than 64·b, such that the hashing scheme may be adjusted accordingly.

In one embodiment, hashing element 218 may comprise a hardware, software, or embedded logic component or a combination of two or more such components. Furthermore, hashing element 218 may compute all hash functions in parallel. In one embodiment, hashing element 218 may process the bucket data in parallel with the input tuple.

In particular embodiments, the hash-based schemes operating in constant time described above may provide one or more advantages over previous ternary content-addressable memory (TCAM) based approaches. A random access memory (RAM) may require less than half the area required by a similarly sized TCAM. Moreover, a TCAM may consume more power than a RAM. Furthermore, RAMs have been the target of several optimizations and may be faster than TCAMs.

The algorithms described in FIG. 2 are only example embodiments. One or more elements may execute one or more portions of the algorithms described above, according to particular needs. One or more elements in FIG. 2 may include a hardware, software, or embedded logic component or a combination of two or more such components for executing one or more portions of the algorithms described above, according to particular needs.

Figure 3:
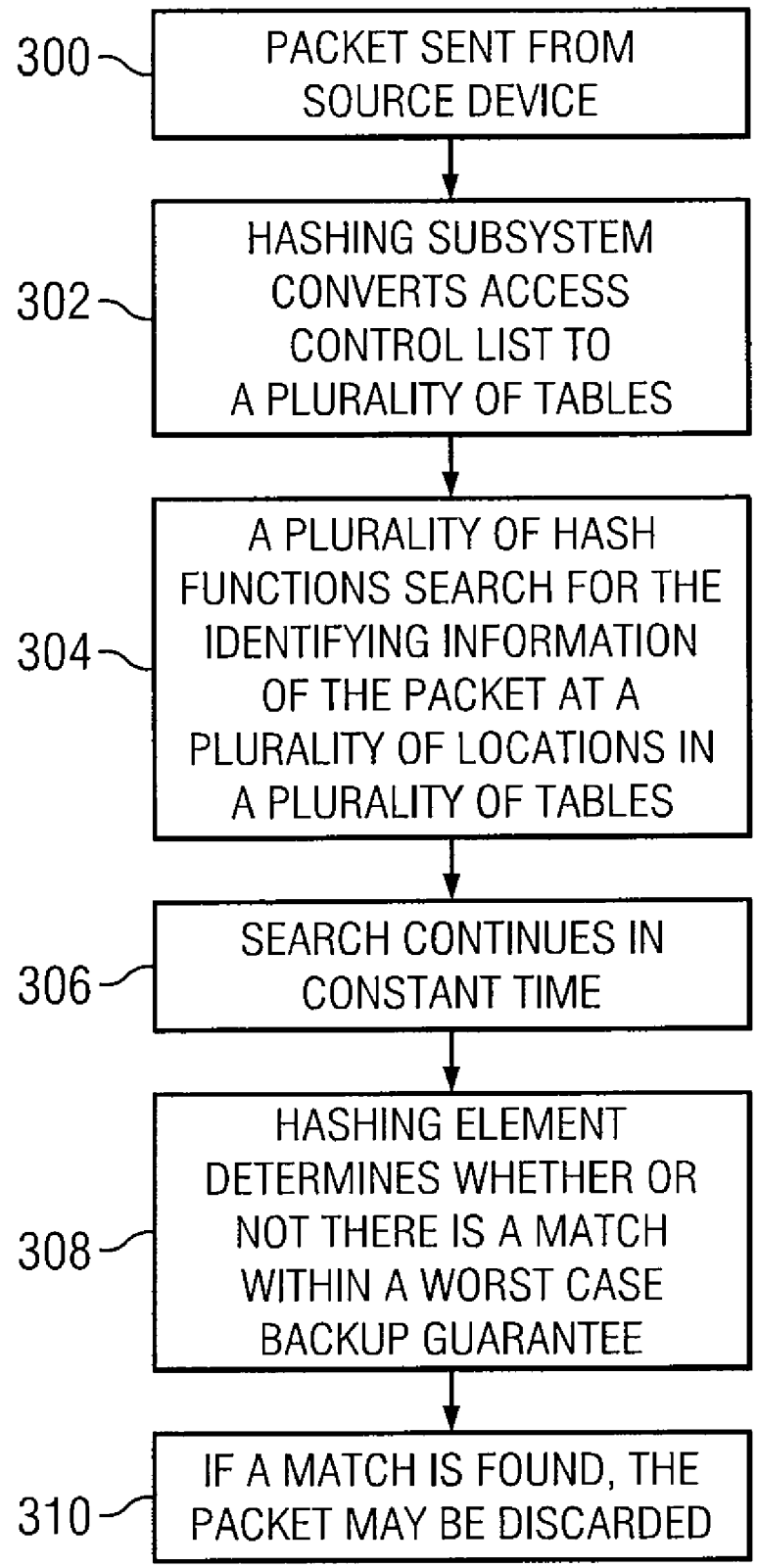
FIG. 3 is a flowchart illustrating a method for determining if data has permission to be routed by a processing device with a hashing element in accordance with a particular embodiment of the present disclosure.

FIG. 3 is a flowchart illustrating a method for determining if data has permission to be routed by a processing device with a hashing element in accordance with a particular embodiment of the present disclosure. The illustrated method may be performed by one or more components of processing device 200 as discussed with respect to FIG. 2. Additionally, certain steps of the illustrated method may be implemented using logic or code embodied on a computer embodied in a computer readable medium.

The illustrated method begins at step 300 where a packet sent from a source device that is destined for a destination device is received by processing device 200. Generally, the packet comprises identifying data that can be matched to the access control list. In particular embodiments, this identifying data may include the source and destination IP address of the packet. At step 302, the hashing element converts the access control list into a plurality of tables having a fixed number of buckets, each bucket having a fixed number of entries. At step 304, the hashing element may use a plurality of hash functions to search in parallel for the identifying data in a plurality of locations in memory of the plurality of tables. At step 306, the hashing element continues to search in constant time until determining if the plurality of hash tables include the identifying information. At step 308, the hashing element determines whether or not the identifying information is located in the plurality of tables with a worst case lookup guarantee. At step 310, if the hashing element locates the identifying information of the packet in one of the plurality of tables, then the packet may be discarded. Otherwise the packet may be forwarded to the destination device.

One skilled in the art will readily recognize that some of the steps illustrated in FIG. 3 may be combined, modified or deleted where appropriate, and additional steps may also be added to the flowchart. It should also be understood that steps may be performed in any suitable order without departing from the intended scope of the invention.

Modifications, additions, or omissions may be made to embodiments and components of the system without departing from its intended scope. As one example, the method and means for extracting the user settings of a computer in a first domain and applying the user settings to a computer in a second domain may be modified. Additionally, while certain embodiments and components of system have been described in detail, numerous changes, substitutions, variations, alterations and modifications may be ascertained by those skilled in the art. It is intended that the present disclosure encompass all such changes, substitutions, variations, alterations and modifications as falling within the spirit and scope of the appended claims.

What is claimed is:

1. A method, comprising:
   receiving a packet comprising identifying data;
   determining a fixed number of two or more hash tables comprising a fixed number of two or more buckets comprising a fixed number of one or more entries, wherein the two or more hash tables store data in memory associated with an access control list, the access control list comprising a data structure used to determine whether a packet received from a source device should be forwarded to a destination device; and
   searching the two or more hash tables in parallel for the identifying data using a plurality of hashing functions and returning a search result.

2. The method of claim 1, further comprising:
   discarding the packet if the identifying data is matched in one of the two or more hash tables.

3. The method of claim 1, wherein the search result is returned within ten clock cycles.

4. The method of claim 1, wherein the searching the two or more hash tables in parallel for the identifying data comprises utilizing a cuckoo hashing scheme.

5. The method of claim 1, wherein the identifying data comprises sixty-four bits associated with a source IP address and destination IP address of the packet.

6. The method of claim 1, wherein the searching is performed in constant time and the search result is returned within a fixed time.

7. The method of claim 1, further comprising converting the access control list to the two or more hash tables.

8. The method of claim 1, wherein the memory has a size at least equal to the product of sixty-four bits and the fixed number of buckets.

9. The method of claim 1, wherein the access control list comprises a plurality of 256 bit values comprising a 128 bit value associated with a source IPv6 address and a 128 bit value associated with a destination IPv6 address.

10. An apparatus, comprising:
    a hashing element operable to:
    receive a packet comprising identifying data;
    determine a fixed number of two or more hash tables comprising a fixed number of two or more buckets comprising a fixed number of one or more entries, wherein the two or more hash tables store data in memory associated with an access control list, the access control list comprising a data structure used to determine whether a packet received from a source device should be forwarded to a destination device; and
    search the two or more hash tables in parallel for the identifying data using a plurality of hashing functions and returning a search result.

11. The apparatus of claim 10, wherein the hashing element is further operable to:
    discard the packet if the identifying data is matched in the two or more hash tables.

12. The apparatus of claim 10, wherein the hashing element is operable to search in constant time and return the search result within a fixed time.

13. The apparatus of claim 10, wherein the hashing element is operable to search the two or more hash tables in parallel for the identifying data utilizing a cuckoo hashing scheme.

14. The apparatus of claim 10, wherein the identifying data comprises sixty-four bits associated with a source IP address and destination IP address of the packet.

15. The apparatus of claim 10, wherein the hashing element is further operable to convert the access control list to the two or more hash tables.

16. The apparatus of claim 10, wherein the memory has a size at least equal to the product of sixty-four bits and the fixed number of buckets.

17. The apparatus of claim 10, wherein the access control list comprises a plurality of 256 bit values comprising a 128 bit value associated with a source IPv6 address and a 128 bit value associated with a destination IPv6 address.

18. A system, comprising:
    means for receiving a packet comprising identifying data;
    means for determining a fixed number of two or more hash tables comprising a fixed number of two or more buckets comprising a fixed number of one or more entries, wherein the two or more hash tables store data in memory associated with an access control list, the access control list comprising a data structure used to determine whether a packet received from a source device should be forwarded to a destination device; and
    means for searching the two or more hash tables in parallel for the identifying data using a plurality of hashing functions and returning a search result, wherein the searching is performed in constant time and the search result is guaranteed not to exceed a fixed time.

19. The system of claim 18, further comprising:
    means for discarding the packet if the identifying data is matched in the two or more hash tables.

20. The system of claim 18, wherein the means for searching is performed in constant time and returns the search result within a fixed time.

* * * * *

UNITED STATES PATENT AND TRADEMARK OFFICE
CERTIFICATE OF CORRECTION

PATENT NO.         : 8,290,934 B2                                                Page 1 of 1
APPLICATION NO.    : 12/537250
DATED              : October 16, 2012
INVENTOR(S)        : Stergios Stergiou et al.

It is certified that error appears in the above-identified patent and that said Letters Patent is hereby corrected as shown below:

On the title page of the patent: item (73) Assignee:

After "Assignee" and before "Limited" delete "fujitsu" and insert --Fujitsu--.

Signed and Sealed this
Thirtieth Day of September, 2014

Michelle K. Lee
*Deputy Director of the United States Patent and Trademark Office*